United States Patent [19]

Kawamoto et al.

[11] 4,035,713
[45] July 12, 1977

[54] AUTOMATIC VOLTAGE REGULATING SYSTEM IN BRUSHLESS GENERATOR

[75] Inventors: Takato Kawamoto; Tsutomu Katauchi; Eizi Narumi, all of Tokyo; Katsutoshi Tagami, Asaka, all of Japan

[73] Assignees: Sawafuji Electric Company, Ltd.; Honda Giken Kogyo Kabushiki Kaisha, both of Tokyo, Japan

[21] Appl. No.: 667,393

[22] Filed: Mar. 16, 1976

[30] Foreign Application Priority Data

Mar. 28, 1975 Japan .............................. 50-37464

[51] Int. Cl.² .......................................... H02P 9/14
[52] U.S. Cl. .................................. 322/28; 322/46; 322/59; 322/87
[58] Field of Search ................. 322/17, 87, 46, 25, 322/59, 19, 28, 86; 310/181

[56] References Cited

U.S. PATENT DOCUMENTS 2,722,652  11/1955  Brainard .......................... 322/46 X
3,365,646  1/1968   Brewster .......................... 322/28 X
3,376,496  4/1968   Lund et al. ....................... 322/28

Primary Examiner—Robert J. Hickey

[57] ABSTRACT

An automatic voltage regulating system in a brushless generator comprising a permanent magnet provided on the stator side of a main generator and constituting a field system of an exciter generator portion, an exciter generating coil provided on the rotor side of the main generator, rectifier for rectifying a voltage induced in the exciter generating coil, a field coil of the main generator excited by the output of the rectifier and provided on the rotor side, and an armature coil of the main generator provided on the stator side, and characterized in that the permanent magnet and a control coil are provided on the exciter field system, and an automatic voltage regulating portion which detects the output voltage of the main generator and supplies the control coil with a controlling current is provided so that fluctuations of the output voltage of the main generator can be absorbed by the control coil.

8 Claims, 4 Drawing Figures

AUTOMATIC VOLTAGE REGULATING SYSTEM IN BRUSHLESS GENERATOR

BACKGROUND OF THE INVENTION

1. Field of the Invention

This invention relates generally to an automatic voltage regulating system in a brushless generator, and more specifically to an automatic voltage regulating system in a brushless generator comprising a permanent magnet provided on the stator side and constituting a field system of an exciter generator portion, and exciter generating coil provided on the rotor side, a rectifier for rectifying a voltage induced in the exciter generating coil, a field coil of a main generator provided on the rotor side and excited by the output of the rectifier, and an armature coil of the main generator provided on the stator side, wherein the output voltage is maintained at a predetermined level by forming the exciter field with the permanent magnet and a control coil and absorbing fluctuations of the output voltage of the main generator by the control coil.

2. Description of the Prior Art

A brushless generator incorporating a rectifier on the rotor side generally has a construction of self-exciting generator in which an exciter field coil is used as the field of an exciter generator portion which feed an exciting current to the main generator. This type of generator has a difficulty in stabilizing voltage in the initial stage of rotation of the generator.

A brushless generator in which voltage stabilization in the initial stage of rotation of the generator is facilitated by using a permanent magnet as an exciter field has been used. However, in order to maintain the output voltage of the main generator at a predetermined level against variations of the output voltage, the generator has to be equipped with an automatic voltage regulator on the output side of the main generator portion, or an automatic voltage regulator on the input side of the field coil of the main generator portion to regulate an exciting current to the field coil of the main generator based on the output voltage of the main generator, and such an automatic voltage regulator has to be of a relatively large capacity.

SUMMARY OF THE INVENTION

An object of this invention is to provide a brushless generator an automatic voltage regulating system which solves the above-mentioned points.

Another object of this invention is to provide in a brushless generator an automatic voltage regulating system which employs in the exciter field a permanent magnet determining most of the field and a control coil absorbing fluctuations of the output voltage of the main generator in order to facilitate voltage stabilization in the initial stage of rotation of the generator and to permit the use of a small-capacity automatic voltage regulator for controlling the control current to the control coil.

Still another object of this invention is to provide in a brushless generator an automatic voltage regulating system in which the permanent magnet constituting the exciter field is composed of a magnetic material having small demagnetizing force and large coercive force, such as ferrite, to prevent the permanent magnet from being demagnetized by the magnetic field produced by the control coil.

Still a further object of this invention is to provide in a brushless generator an automatic voltage regulating system in which the power for the automatic voltage regulator is supplied from a coil wound in a dummy slot, or an auxiliary coil including a voltage whose electrical angle is 90° apart from that of the armature coil of the main generator to prevent the auxiliary coil from being affected by the induction produced in the armature coil of the main generator so that the automatic voltage regulator is protected from damage caused by the kick voltage produced in the armature coil of the main generator due to load fluctuations.

Figure 1:
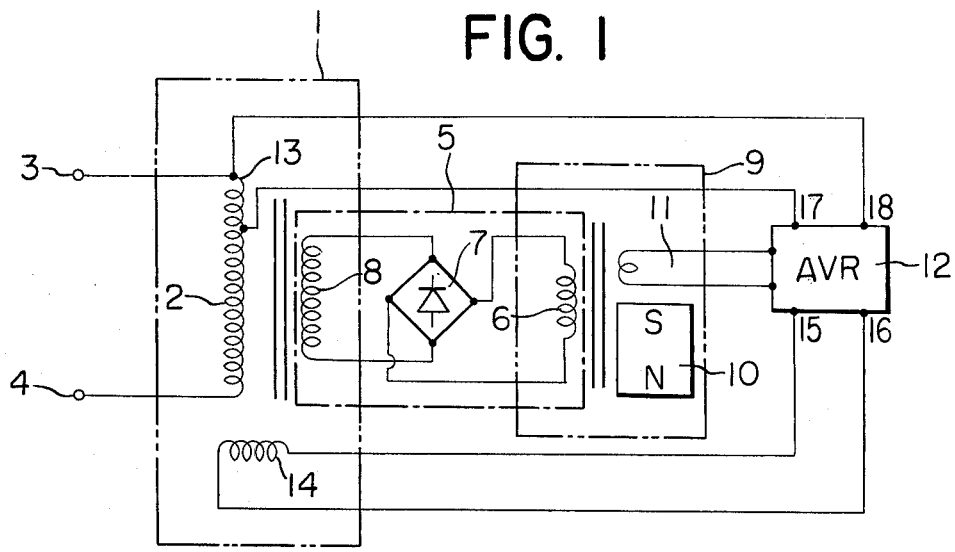
FIG. 1 is a schematic diagram illustrating an automatic voltage regulating system in a brushless generator embodying this invention.

DETAILED DESCRIPTION OF THE PREFERRED EMBODIMENTS:

In FIG. 1, numeral 1 indicates a main generator portion which has a main generator armature coil 2 having output terminals 3 and 4. Numeral 5 is the rotor portion of a brushless generator, which has an exciter generating coil 6, a rectifier 7 for rectifying the output of the exciter generating coil 6, and a main generator field coil 8. An exciter generator portion 9 whose field system is composed of a permanent magnet determining most of the voltage produced in the exciter generating coil 6 and a control coil 11 for regulating the output voltage of the main generator 1. An automatic voltage regulator portion 12 which introduces a detection output from a detecting coil 13 constituting part of the main generator armature coil 2 and an output from an auxiliary coil 14 as its power supply, and controls the controlling current to the control coil 11. The permanent magnet 10 is made of a magnetic material which has small demagnetizing force and large coercive force, such as ferrite. The auxiliary coil 14 induces a voltage whose electrical angle is 90° apart from that of the main generator armature coil 2.

In the initial stage of rotation of the generator, an AC voltage is produced by the permanent magnet 10 of the exciter generator portion 9 with the rotation of the generator rotor portion 5, and the AC voltage is converted into direct current in the rectifier 7 to feed the main generator field coil 8. That is, the main generator field coil 8 is excited and a voltage is generated in the armature coil 2 of the main generator 1. In this way, the output voltage of the generator is easily established by the use of the permanent magnet 10 in the initial stage of rotation of the generator.

Figure 3:
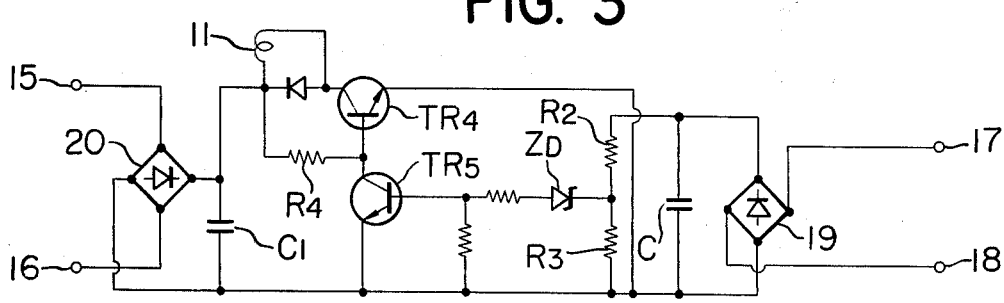
Figure 4:
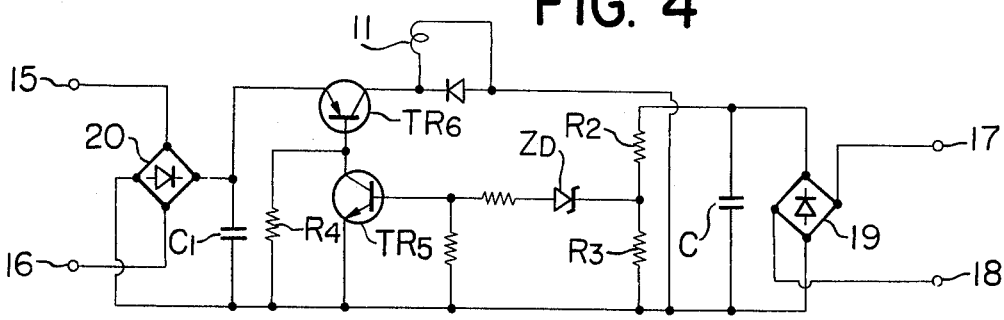

Since the power for automatic voltage regulator portion 12 is supplied by the auxiliary coil 14, voltage is not induced in the auxiliary coil 14 by a kick voltage, which may be produced in the armature coil 2 by fluctuations of the load connected across the terminals 3 and 4. As a result, the automatic voltage regulator portion 12 as shown in FIGS. 2 through 4 can be protected from damage.

In general, the armature of this type of generator has a dummy slot, on which no coil is wound. In this invention, the auxiliary coil 14 is wound on the dummy slots to supply power to the automatic voltage regulator portion. This offers an advantage over the type of generator in which power for the automatic voltage regulator portion is supplied by the armature coil of the main generator in that a high output, small-sized generator is made possible.

Next, description will be made on the circuit configuration and operation in each embodiment of the automatic voltage regulator portion 12 shown in FIGS. 2 through 4.

Figure 2:
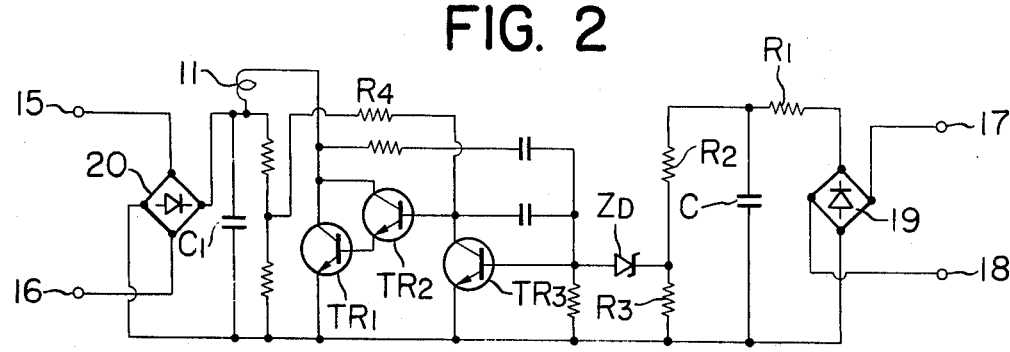
FIGS. 2 through 4 show the embodiments of the automatic voltage regulating system shown in FIG. 1.

In FIG. 2, TR1 and TR2 are Darlington-connected control transistors for controlling the controlling current to the control coil 11, TR3 is a drive transistor for controlling the turn-on and turn-off of the control transistors TR1 and TR2. ZD is a constant voltage element, a zener diode, for example, which is brought into conduction, when the voltage induced in the detecting coil 13 shown in FIG. 1 exceeds a predetermined zener voltage, to turn on the drive transistor TR3. R1, R2 and R3 are potentiometers for diving the DC voltage rectified by a diode bridge 19. 19 and 20 are diode bridges. Other numerals correspond with like numerals in FIG. 1. In this embodiment, the control coil 11 is so constructed as to produce magnetic field having the same polarity as that of the permanent magnet 10 shown in FIG. 1 so that the field of the exciter generator portion 9 is given by the sum of the field produced by the permanent magnet 10 and the auxiliary field produced by the control coil 11.

When the output voltage of the main generator portion 1 as shown in FIG. 1 is less than a predetermined reference voltage, the terminal voltage of the potentiometer R3 determined by the voltage induced in the detecting coil 13 as shown in FIG. 1 is less than the zener voltage, thus the diode ZD being turned off. Consequently, the drive transistor TR3 is brought into off state and the control transistors TR1 and TR2 are put into on state via the resistor R4. Therefore, the voltage induced in the auxiliary coil 14 as shown in FIG. 1 and applied across the terminals 15 and 16 is fed to the control coil 11 via the diode bridge 20 and the control transistor TR1. That is, when the output voltage of the main generator portion 1 is less than the reference voltage, a controlling current is supplied to the control coil 11, and the field of the exciter generator portion 9 as shown in FIG. 1 is given by the sum of the field produced by the permanent magnet 10 and the field produced by the control coil 11.

In this state, supposing that the output voltage of the main generator portion exceeds the reference voltage for some reason or other, the output of the detecting coil 13 increases, and the output thus increased allows current to flow in a circuit formed by the diode bridge 19 and the potentiometers R1, R2 and R3, whereby the terminal voltage across the potentiometer R3 exceeds the zener voltage of the zener diode ZD. This permits the zener diode ZD to conduct, bringing the drive transistor TR3 from OFF state to ON state. At the same time, the control transistors TR1 and TR2 are also shifted from ON state to OFF state. As a result, the shift of the control transistors TR1 and TR2 to OFF state prevents the controlling current from flowing in the control coil 11. In this way, when the output voltage of the main generator portion 1 exceeds the reference voltage, the controlling current stops to flow in the control coil 11. That is, the field of the exciter generator portion 9 is given only by the field produced in the permanent magnet 10 to reduce the exciting current to the field coil 8 of the main generator portion 1, which in turn reduces the output voltage of the main generator portion 1.

When the output voltage of the main generator portion 1 exceeds the reference voltage and then decreases to less than the reference voltage, the drive transistor TR3 is shifted from ON state to OFF state, and the control tansistors TR1 and TR2 are also shifted from OFF state to ON state. As a result, the control current begins to flow again to the control 11, and the field of the exciter generator portion 9 is given by the sum of the field produced by the permanent magnet 10 and the field produced by the control coil 11. That is, the exciting current in the field coil 8 of the main generator portion 1 and the output voltage of the main generator portion 1 increase.

In the manner, the automatic voltage regulator portion 12 detects the output voltage of the main generator portion 1 to control the controlling current to the control coil 11 so that the output voltage of the main generator portion 1 can be maintained at a predetermined level by absorbing fluctuations of the output voltage of the main generator portion 1. The ripple content of the voltage applied to the automatic voltage regulator portion 12 is reduced by increasing the capacity of the smoothing capacitor C1 shown in the figure. By doing so, automatic voltage regulating effect can be enhanced, the voltage - current drooping characteristics of the generator can be improved, and the generator can be operated at high output.

FIG. 3 shows another embodiment of the automatic voltage regulator portion 12. In the embodiment shown in FIG. 3, the so-called series dropper system is adopted in which the controlling current to the control coil 11 is continously increased or decreased while the embodiment shown in FIG. 2 employs the so-called switching system in which the controlling current to the control coil 11 is supplied or stopped with the on-off operation of the control transistors TR1 and TR2.

In FIG. 3, TR4 is a control transistor equivalent to the control transistors TR1 and TR2 in FIG. 2, TR5 is a drive transistor equivalent to the drive transistor TR3 in FIG. 2. Other numerals correspond to like numerals in FIG. 2. As in FIG. 2, the control coil 11 is so constructed that the field of the exciter generator portion 9 is given by the sum of the field produced by the permanent magnet 10 and the field produced by the control coil 11.

In this embodiment, when the output voltage of the main generator portion 1 is lower than a certain voltage level less than the reference voltage, the zener diode ZD is cut off, the drive transistors TR5 is in OFF state and the control transistor TR4 is in ON state via the resistor R4, as in the embodiment of FIG. 2. However, after the output voltage of the main generator portion 1 exceeds the certain voltage level, the operating point of the drive transistor TR5 is set to be at the center of the linear region so that the control transistor TR4 can have a collector current value corresponding to the collector current value of the drive transistor TR5. In other words, when the output voltage exceeds the certain voltage, more zener current flows, the base current of the drive transistor TR5 increases, the collector current of the drive transistor TR5 also increases, causing the base current of the control transistor TR4 and the collector current of the control transistor TR4 to decrease, thus the current in the control 11 drops. Consequently, the electromotive force of the exciter generator portion 9 decreases and the output voltage also decreases. On the other hand, when the output voltage lowers, the reversed process of above increase the current in the control coil 11, the electromotive force of the exciter generator portion 9, and therefore the output voltage. Thus, in this embodiment too, the output voltage of the main generator portion 1 can be maintained at a predetermined level. The effect of the smoothing capacitor C1 is the same as in FIG. 2.

The embodiment of the automatic voltage regulator portion 12 shown in FIG. 4 is so constructed that, contrary to the embodiments shown in FIGS. 2 and 3, the field of the exciter generator portion 9 is given by the difference between the field produced by the permanent magnet 10 and the auxiliary field produced by the control coil 11. In the embodiment shown in FIG. 4, PNP type transistor is employed for the control transistor TR6 while NPN type transistor is used for the control transistor TR4 in the embodiment shown in FIG. 3. Therefore, in the embodiment shown in FIG. 4, when the output voltage is lower than a certain voltage level less than the reference voltage, realtively small controlling current is supplied to the control coil 11, maintaining the field of the exciter generator portion 9 at a high level. On the other hand, when the output voltage exceeds the certain voltage level, the larger the positive differential voltage between the output voltage and the certain voltage level, the higher the collector current of the control transistor TR6, or the controlling current to the control coil 11, keeping the field of the exciter generator portion 9 at a low level. In this embodiment, the permanent magnet 10 is disposed in such a direction that the permanent magnet 10 is affected by the demagnetizing force by the control coil 11, but the use of the magnetic material, such as ferrite, that has small demagnetizing force and large coercive force effectively for the permanent magnet 10 prevents the permanent magnet 10 from being affected by the demagnetizing force, ensuring a stable field system.

As described above, this invention facilitates voltage stabilization in the initial stage of rotation of the generator, and maintains the output voltage at a predetermined level by absorbing fluctuations of the output voltage of the main generator. Furthermore, in this invention, regulation of the voltage of the main generator can be performed only by regulating the field of the exciter generator, and by compensating fluctuations of the voltage in the control coil. This permits the substantial reduction of the capacity of the automatic voltage regulator. Circuit elements of the automatic voltage regulator portion 12 can be protected from damage even when a kick voltage is generated in the armature coil 2 because the power of the automatic voltage regulator portion 12 is supplied from the auxiliary coil 14 which induces a voltage whose electrical angle is 90° apart from that of the voltage in the armature coil 2. In addition, the use of the auxiliary coil 14 makes possible a high power and small-sized generator. The use of a magnetic material, such as ferrite, that has small demagnetizing force and large coercive force for the permanent magnet 10 virtually prevents the permanent magnet 10 from being demagnetized by the field produced by the control coil 11, stabilizing the exciter field by the permanent magnet 10.

What is claimed is:

1. An automatic voltage regulating system in a brushless generator comprising a permanent magnet provided on the stator side and constituting a field of an exciter generator portion, an exciter generating coil provided on the rotor side, a rectifier for rectifying a voltage induced in the exciter generating coil, a field coil of the main generator provided on the rotor side and excited by the rectifier output, and an armature coil of the main generator provided on the stator side, wherein a permanent magnet and a control coil are provided in the exciter field, and an automatic voltage regulator portion is is provided for detecting the output voltage of the main generator and supplying a controlling current to the control coil so that fluctuations of the output voltage of the main generator is absorbed through the control of the control coil, wherein an auxiliary coil whose electrical angle is 90° apart from that of the armature coil of the main generator is provided to supply a voltage induced in the auxiliary coil to the automatic voltage regulator portion as a power source.

2. An automatic voltage regulating system in a brushless generator as set forth in claim 1 wherein the automatic voltage regulator portion has a drive transistor controlling switching based on the output voltage of the main generator, and a control transistor whose switching is controlled by the switching operation of the drive transistor and which controls the supply of the controlling current to the control coil.

3. An automatic voltage regulating system in a brushless generator as set forth in claim 2, wherein the control coil is so constructed that the field of the exciter generator portion is given by the sum of the field produced by the permanent magnet and the auxiliary field produced by the control coil.

4. An automatic voltage regulating system in a brushless generator as set forth in claim 2 wherein the control coil is so constructed that the field of the exciter generator portion is given by the difference between the field produced by the permanent magnet and the auxiliary field produced by the control coil.

5. An automatic voltage regulating system in a brushless generator as set forth in claim 1 wherein the automatic voltage regulator portion has a drive transistor whose operation is controlled within the linear region of its operating characteristic by the output voltage of the main generator, and a control transistor whose operation is controlled within the linear region of its operating characteristic by the drive transistor and which continuously increases or decreases the controlling current to the control coil.

6. An automatic voltage regulating system in a brushless generator as set forth in claim 5 wherein the control coil is so constructed that the field of the exciter generator portion is given by the sum of the field produced by the permanent magnet and the auxiliary field produced by the control coil.

7. An automatic voltage regulating system in a brushless generator as set forth in claim 5 wherein the control coil is so constructed that the field of the exciter generator portion is given by the difference between the field produced by the permanent magnet and the auxiliary field produced by the control coil.

8. An automatic voltage regulating system in a brushless generator as set forth in claim 1 wherein the permanent magnet is made of a magnetic material that has a large coercive force.

\* \* \* \* \*